US006567645B1

(12) United States Patent
Wiedeman et al.

(10) Patent No.: US 6,567,645 B1
(45) Date of Patent: May 20, 2003

(54) MULTIPLE SATELLITE REPEATER MANAGEMENT SYSTEM USING FRAME ERROR RATE FOR DIVERSITY SELECTION

(75) Inventors: Robert A. Wiedeman, Sedalia, CO (US); Paul A. Monte, San Jose, CA (US); Kent A. Penwarden, Los Altos, CA (US)

(73) Assignee: Globalstar L.P., San Jose, CA (US)

( * ) Notice: Subject to any disclaimer, the term of this patent is extended or adjusted under 35 U.S.C. 154(b) by 408 days.

(21) Appl. No.: 09/649,326

(22) Filed: Aug. 28, 2000

(51) Int. Cl.$^7$ ............................................. H04B 7/185
(52) U.S. Cl. ................ 455/12.1; 455/13.4; 455/428; 455/430
(58) Field of Search .................. 455/12.1, 13.4, 455/67.1, 69, 427, 428, 430

(56) References Cited

U.S. PATENT DOCUMENTS

| | | | |
|---|---|---|---|
| 5,233,626 A | 8/1993 | Ames ............................. 375/1 |
| 5,265,119 A | * 11/1993 | Gilhousen et al. ........... 370/335 |
| 5,303,286 A | 4/1994 | Wiedeman .................... 379/59 |
| 5,422,647 A | 6/1995 | Hirshfield et al. ........... 342/354 |
| 5,448,623 A | 9/1995 | Wiedeman et al. ............ 379/59 |
| 5,526,404 A | 6/1996 | Wiedeman et al. ............ 379/60 |
| 5,552,798 A | 9/1996 | Dietrich et al. ............... 343/893 |
| 5,592,481 A | 1/1997 | Wiedeman et al. .......... 370/316 |
| 5,619,525 A | 4/1997 | Wiedeman et al. .......... 375/200 |
| 5,664,006 A | 9/1997 | Monte et al. ................. 455/405 |
| 5,697,050 A | 12/1997 | Wiedeman .................... 455/12.1 |
| 5,758,260 A | 5/1998 | Wiedeman .................... 455/12.1 |
| 5,787,336 A | 7/1998 | Hirshfield et al. ........... 455/13.4 |
| 5,867,109 A | 2/1999 | Wiedeman .................... 340/827 |
| 5,881,367 A | * 3/1999 | Calot et al. ................... 455/13.1 |
| 5,884,142 A | 3/1999 | Wiedeman et al. .......... 455/12.1 |
| 5,896,558 A | 4/1999 | Wiedeman .................... 455/12.1 |
| 5,956,619 A | * 9/1999 | Gallagher et al. ............ 455/69 |
| 5,999,623 A | 12/1999 | Bowman et al. .............. 380/20 |
| 6,067,442 A | 5/2000 | Wiedeman et al. .......... 455/13.1 |
| 6,085,067 A | 7/2000 | Gallagher et al. ........... 455/13.1 |
| 6,091,933 A | * 7/2000 | Sherman et al. ............. 370/335 |
| 6,477,355 B1 | * 11/2002 | Grayson et al. ............. 455/12.1 |

* cited by examiner

Primary Examiner—Thanh Cong Le
Assistant Examiner—Tsuleun Lei
(74) Attorney, Agent, or Firm—Ohlandt, Greeley, Ruggiero & Perle, L.L.P.

(57) ABSTRACT

A method for operating a mobile satellite telecommunications system has steps of (a) providing a user terminal that is operable to simultaneously receive a communication signal from a gateway via a plurality of satellites; and, (b) at the gateway, selectively transmitting the communication to one satellite or a plurality of satellites each having a coverage area that includes a current location of the user terminal. The step of selectively transmitting includes a step of considering a plurality of factors, including a current reception state of the user terminal, a current state of satellite power of at least one of the plurality of satellites, and a predicted required state of satellite power of the at least one satellite. The current reception state of the user terminal is indicated by a received signal quality indicator, which in the preferred embodiment is expressed as the Frame Error Rate (FER). If the value of the FER increases above a threshold level the number of selected satellites is increased, thereby increasing satellite diversity, and if the FER decreases below the threshold level the number of selected satellites is decreased, thereby decreasing satellite diversity. In addition, when a plurality of satellites are selected, the power through each selected satellite is controlled proportionally. The overall effect is conserve satellite power and optimize satellite power consumption, so as to satisfy future demand for the satellite's circuits.

18 Claims, 13 Drawing Sheets

MULTIPLE SATELLITE REPEATER MANAGEMENT SYSTEM USING FRAME ERROR RATE FOR DIVERSITY SELECTION

FIELD OF THE INVENTION

This invention relates generally to satellite-based communication systems and methods and, in particular, relates to mobile satellite communication systems and methods.

BACKGROUND OF THE INVENTION

Satellite Telephone Systems are rapidly emerging as a global business. These systems typically utilize many individual circuits that are routed through a constellation of satellites in low earth orbit (LEO) to effect communications. One important advantage of the satellite telephone system is that it provides ubiquitous coverage of large areas of the earth, without requiring the deployment of many small terrestrial cells.

After bands of frequencies were made available for the satellite telephone systems, one approach that was taken to provide multiple access capability used Time Division Multiple Access (TDMA), while a second approach used Code Division Multiple Access (CDMA). An attractive feature of the CDMA approach is an ability to share the frequencies by co-frequency operation, wherein a plurality of satellite repeaters operate on the same frequency. Combined with Low Earth Orbit (LEO) operation, and receiver designs having an ability to simultaneously receive multiple copies of the same data from multiple satellites, this feature allows a user terminal to receive signals for one, two, or more satellite repeaters simultaneously. This type of operation can be referred to as satellite diversity reception.

The constellation of satellites may be conveniently viewed as a large capacity of circuits in space, much like a distributed battery. That is to say, the sum of the stored power on the satellites (in terms of amp hours of real batteries), and the instantaneous power available from the deployed solar panels, yields the ability of the constellation of LEO satellites, or more generally the constellation of non-geosynchronous orbit (NGSO) satellites, to deliver communication circuit capacity to a region or succession of regions.

As can be appreciated, in order to successfully operate the satellite communication system for extended periods, with various satellites passing into and out of high traffic and low traffic areas at various times, it is important to correctly plan and allocate the usage of the various satellites to insure that all terrestrial service areas always have an adequate amount of coverage.

One method of selectively assigning user terminals to certain satellite repeaters to optimize, at least to a first order, the utilization of the satellite constellation is disclosed in U.S. Pat. No. 5,867,109, entitled "Satellite Repeater Diversity Resource Management System", Robert A. Wiedeman. In this approach to solving the satellite allocation problem the system optimizes satellite path diversity to individual user terminals, and may deny or limit the use of diversity, based on one or more factors such as the location of user terminal and a radio propagation environment in the vicinity of the user terminal's location.

Reference can also be made to U.S. Pat. No. 5,867,109, entitled "Multiple Satellite Repeater Capacity Loading with Multiple Spread Spectrum Gateway Antennas", by Robert A. Wiedeman et al., which describes methods for assigning satellites to user terminals by considering elevation angle and other criteria.

OBJECTS AND ADVANTAGES OF THE INVENTION

A first object and advantage of this invention is to provide a system and a method for optimizing the capacity, reducing the satellite power, and improving the quality of the service delivered to users of a mobile communication satellite system.

It is a further object and advantage of this invention is to provide a mobile satellite communications system and method wherein available satellite repeaters are allocated and deallocated on the forward link transmission to user terminals based on a received signal quality indication, preferably a Frame Error Rate (FER) at the user terminal and then transmitted back to the ground station. Alternatively, FER may be determined at a ground station, based on return link quality and assuming that reverse link signal propagation conditions correlate with forward link signal propagation conditions.

SUMMARY OF THE INVENTION

The foregoing and other problems are overcome and the objects of the invention are realized by methods and apparatus in accordance with embodiments of this invention.

Disclosed herein is a a mobile satellite telecommunications system, and a method for operating the system, which will provide a real time method of accomplishing satellite constellation power optimization. The method comprises the steps of (a) providing a user terminal that is operable to simultaneously receive a communication signal from a ground station or gateway via a plurality of satellites; and, (b) at the ground station, selectively transmitting the communication to one satellite or a plurality of satellites each having a coverage area that includes a current location of the user terminal. In accordance with this invention the step of selectively transmitting includes a step of considering a plurality of factors, including a current reception state of the user terminal, a current state of satellite power of at least one of the plurality of satellites, and a predicted required state of satellite power of the at least one satellite.

The current reception state of the user terminal is indicated by a received signal quality indicator, which in the preferred embodiment is expressed as the Frame Error Rate (FER).

In one embodiment the FER is determined in the user terminal from a forward link transmission from the gateway, and the method further includes a step of sending an indication of the FER to the ground station using a reverse link transmission. In another embodiment the FER is determined in the ground station from a reverse link transmission from the user terminal. Preferably the indication of the Frame Error Rate is based on a relationship of a current value of the Frame Error Rate to previous values of the Frame Error Rate. If the value of the FER increases above a threshold level the number of selected satellites is increased, thereby increasing satellite diversity, and if the FER decreases below the threshold level the number of selected satellites is decreased, thereby decreasing satellite diversity.

BRIEF DESCRIPTION OF THE DRAWINGS

The above set forth and other features of the invention are made more apparent in the ensuing Detailed Description of the Invention when read in conjunction with the attached Drawings, wherein.

wherein FIGS. 9, 11, 12 and 13 all depict the generation of a Frame Error Rate (FER) signal quality indication that is employed in the preferred embodiment of this invention for selectively allocating and deallocating satellite diversity to the user terminal.

DETAILED DESCRIPTION OF THE INVENTION

Figure 1:
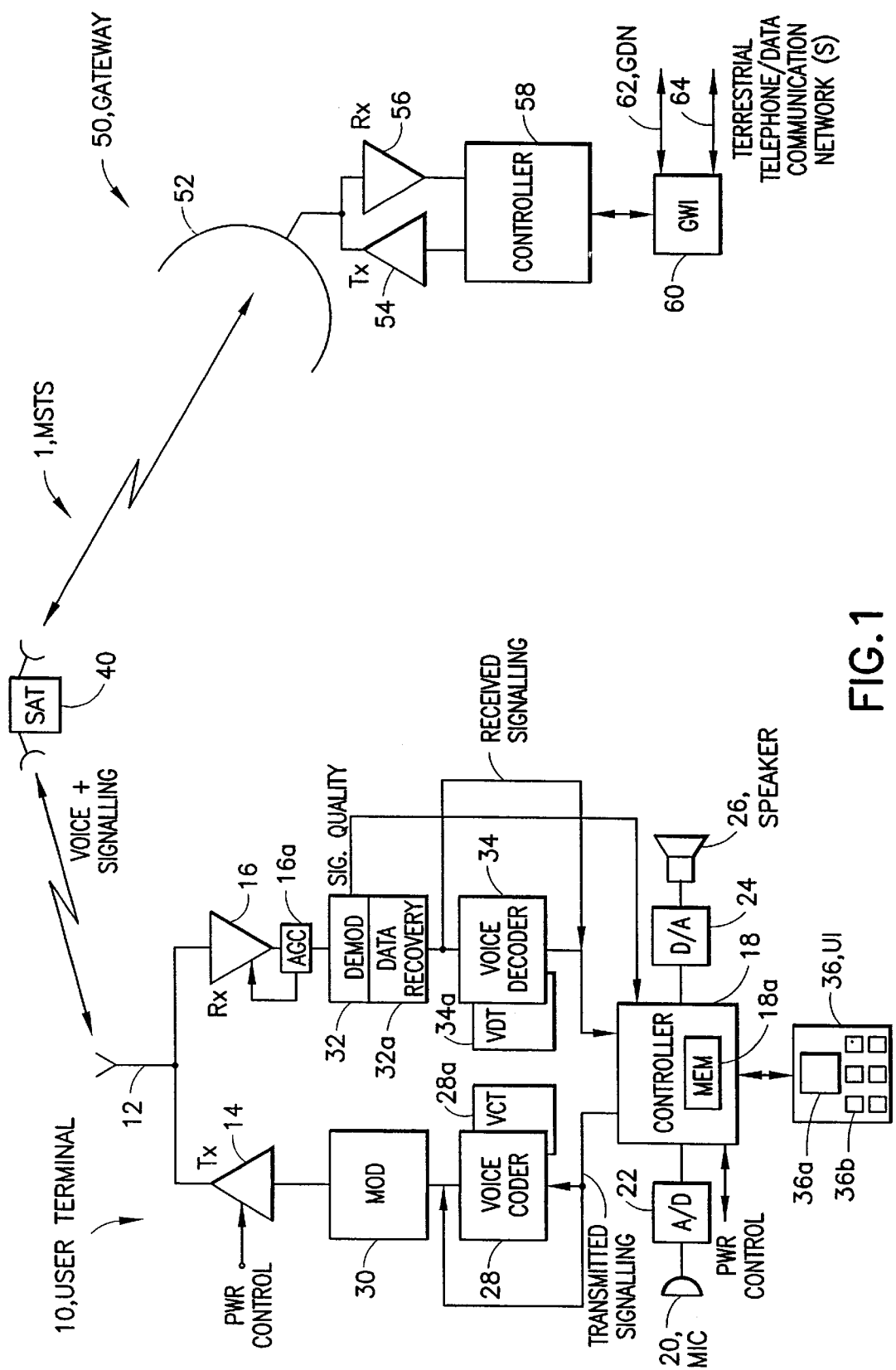
FIG. 1 is a simplified block diagram of a digital wireless telecommunications system, embodied as a mobile satellite telecommunications system, that is suitable for practicing this invention.

Reference is first made to FIG. 1 for illustrating a simplified block diagram of a digital wireless telecommunications system, embodied herein as a mobile satellite telecommunications system (MSTS) 1, that is suitable for practicing this invention. While described in the context of the MSTS 1 that uses CDMA radio links, those skilled in the art should appreciate that the teachings of this invention have application to other types of systems, including TDMA systems if such systems employ diversity reception techniques.

The MSTS 1 includes at least one, but typically many, wireless user terminals (UTs) 10, at least one, but typically several, communications satellite 40, and at least one, but typically several, communications ground stations or gateways 50.

Reference in this regard can be had, by example, to U.S. Pat. No. 5,526,404, "Worldwide Satellite Telephone System and a Network Coordinating Gateway for Allocating Satellite and Terrestrial Resources", by Robert A. Wiedeman and Paul A. Monte; to U.S. Pat. No. 5,303,286, "Wireless Telephone/Satellite Roaming System", by Robert A. Wiedeman; to U.S. Pat. No. 5,619,525, "Closed Loop Power Control for Low Earth Orbit Satellite Communications System", by Robert A. Wiedeman and Michael J. Sites; and to U.S. Pat. No. 5,896,558 "Interactive Fixed and Mobile Satellite Network", by Robert A. Wiedeman, for teaching various embodiments of satellite communications systems, such as low earth orbit (LEO) satellite systems, that can benefit from the teachings of this invention. Reference may also be had to the above mentioned U.S. Pat. No. 5,867,109, entitled "Satellite Repeater Diversity Resource Management System", by Robert A. Wiedeman, and to the above mentioned U.S. Pat. No. 5,867,109, entitled "Multiple Satellite Repeater Capacity Loading with Multiple Spread Spectrum Gateway Antennas", by Robert A. Wiedeman et al. The disclosures of these various U.S. Patents are incorporated by reference herein in their entireties, in so far as they do not conflict with the teachings of this invention.

The exemplary UT 10 includes at least one antenna 12 for transmitting and receiving RF signals and a RF transmitter (TX) 14 and a RF receiver (RX) 16 having an output and an input, respectively, coupled to the antenna 12. A controller 18, which may include one or more microprocessors and associated memories 18a and support circuits, functions to control the overall operation of the UT 10. An input speech transducer, typically a microphone 20, provides a user's speech signals to the controller 18 through a suitable analog to digital (A/D) converter 22. An output speech transducer, typically including a loudspeaker 26, outputs received speech signals from the controller 18, via a suitable digital to analog (D/A) converter 24. The UT 10 will also typically comprise some type of user interface (UI) 36 that is coupled to the controller 18, such as a LCD display 36a and a keypad 36b.

A transmit path includes a desired type of voice coder (vocoder) 28 that receives a digital representation of the input speech signals from the controller 18, and includes voice coder tables (VCT) 28a and other required support circuitry, as is well known in the art. The output of the vocoder 28, which is a lower bit rate representation of the input digital speech signals or samples, is provided to a RF modulator (MOD) 30 for modulating a RF carrier, and the modulated RF carrier is upconverted to the transmission frequency and applied to the input to the RF transmitter amplifier 14. Signalling information to be transmitted from the UT 10 is output from the controller 18 to a signalling path that bypasses the vocoder 28 for application directly to the modulator 30. Not shown or further discussed is the framing of the transmitted signal for a TDMA type system, or the spreading of the transmitted signal for a CDMA type system, since these operations are not germane to an understanding of this invention. Other operations can also be performed on the transmitted signal, such as Doppler precorrection, interleaving, and other well known operations.

A receive path includes the corresponding type of voice decoder 34 that receives a digital representation of a received speech signal from a corresponding type of demodulator (DEMOD) 32. The demodulator 32 includes a data recovery block 32a (see also FIGS. 11, 12 and 13), as will be discussed in greater detail below, and is preceded by a receiver Automatic Gain Control (AGC) block 16a (see also FIGS. 12 and 13), as will also be discussed in greater detail below. The voice decoder 34 includes voice decoder tables (VDT) 34a and other required support circuitry, also as is well known in the art. The output of the voice decoder 34 is provided to the controller 18 for audio processing, and is thence sent to the D/A converter 24 and the loudspeaker 26 for producing an audible voice signal for the user. As with the transmitter path, other operations can be performed on the received signal, such as Doppler correction, deinterleaving, and other well known operations. In a manner analogous to the transmit path, received signalling information is input to the controller 18 from a signalling path that bypasses the voice decoder 34 from the demodulator 32/data recovery block 32a.

The RF signals transmitted from the UT 10 and those received by the UT 10 pass through at least one satellite 40, which may be in any suitable altitude and orbital configuration (e.g., circular, elliptical, equatorial, polar, etc.) In the preferred embodiment the satellite 40 is one of a constellation of Low Earth Orbit (LEO) satellites, although one or more Medium Earth Orbit (MEO) satellites could be used, as could one or more geosynchronous orbit satellites. The satellite 40 may be a bent pipe type of repeater satellite, or it may provide on-board signal processing wherein a received transmission is at least partially demodulated to baseband, processed in some way on the satellite, remodulated and then transmitted. The particular type of satellite that is in use is not of particular importance to the teachings of this invention, except as may be noted below. The preferred embodiment of this invention employs a constellation of bent pipe repeater satellites.

The satellite 40 serves to bidirectionally couple the UT 10 to the gateway 50. The gateway 50 includes a suitable RF antenna 52, such as steerable parabolic antenna, for transmitting an uplink feederlink to, and for receiving a downlink feederlink from the satellite 40. The feederlinks will typically include communication signals for a number of UTs 10. The gateway 50 further includes a transceiver, comprised of transmitters 54 and receivers 56, and a gateway controller 58 that is bidirectionally coupled to a gateway interface (GWI) 60. The GWI 60 provides connections to a Ground Data Network (GDN) 62 through which the gateway 50 communicates with a ground operations control center (GOCC 70 shown in FIG. 10) and possibly other gateways. The GWI 60 also provides connections to one or more terrestrial telephone and data communications networks 64, such as the Public Switched Telephone Network (PSTN), and/or the Internet, whereby the UT 10 can be connected to any wired or wireless telephone, or to another UT, through the terrestrial telecommunications network. The gateway 50 also includes banks of modulators, demodulators, voice and data coders and decoders, as well as other well known types of equipment, which are not shown to simplify the drawing.

Figure 2:
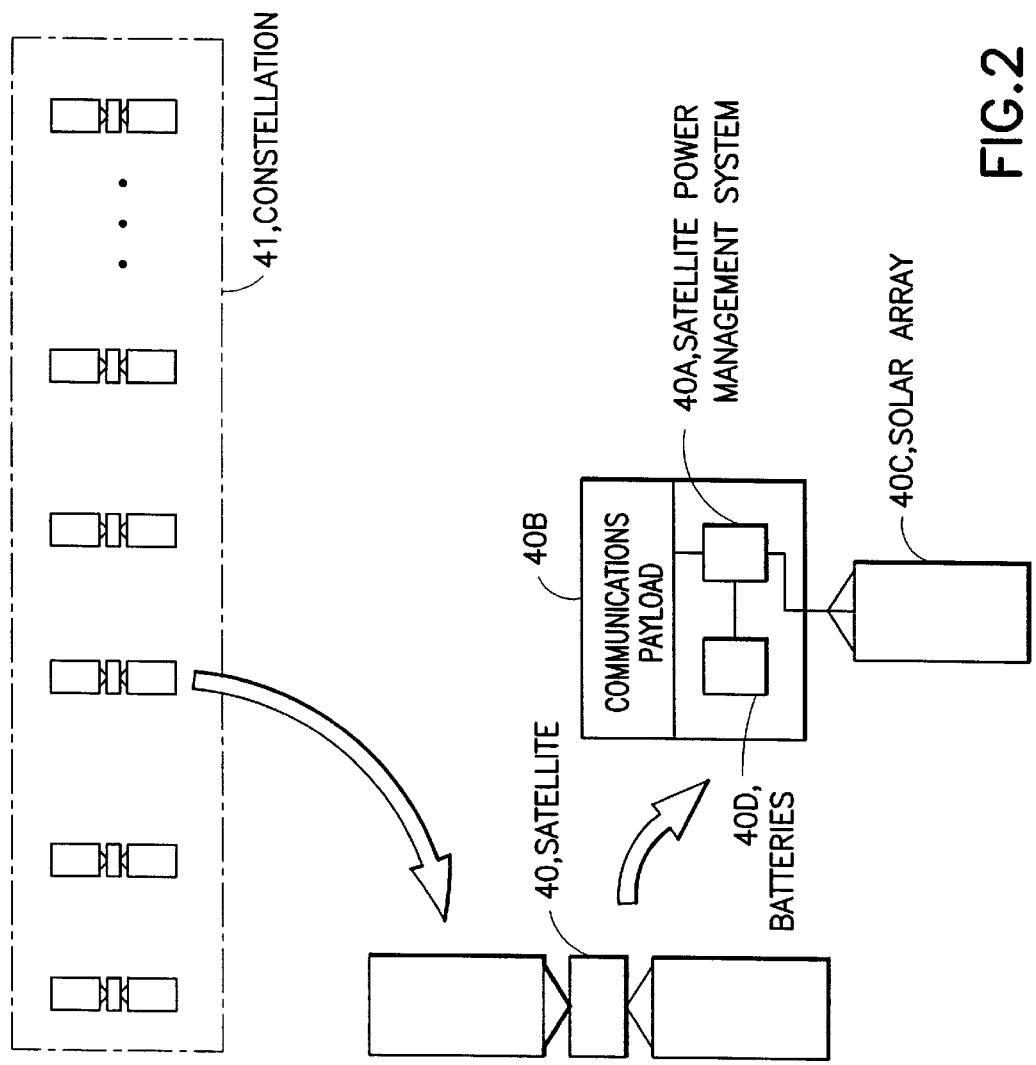
FIG. 2 is a simplified depiction of a satellite constellation and one satellite repeater of the constellation.

Having thus described one suitable but not limiting embodiment of a mobile satellite telecommunications system that can be used to practice this invention, and in order to gain a greater appreciation of the benefits bestowed by the use of the teachings of this invention, reference is now made to FIG. 2 for illustrating a constellation 41 of many LEO satellites 40. On each satellite 40 there are several systems. Of most interest to this discussion are a power generation and management system 40A and a communications payload 40B. The power is generally developed by solar panels 40C which, when faced toward the sun, generate power that can be used for communications, operating the other (unillustrated) subsystems of the satellite 40, or used for charging a bank of batteries 40D. The batteries 40D are employed for peak hour capacity delivery and for eclipse operation, when the earth is between the satellite 40 and the sun. The satellite power management system 40A produces power from the batteries 40D and solar panels 40C, working in tandem, to supply the necessary power to the satellite repeater communications payload 40B.

Figure 3:
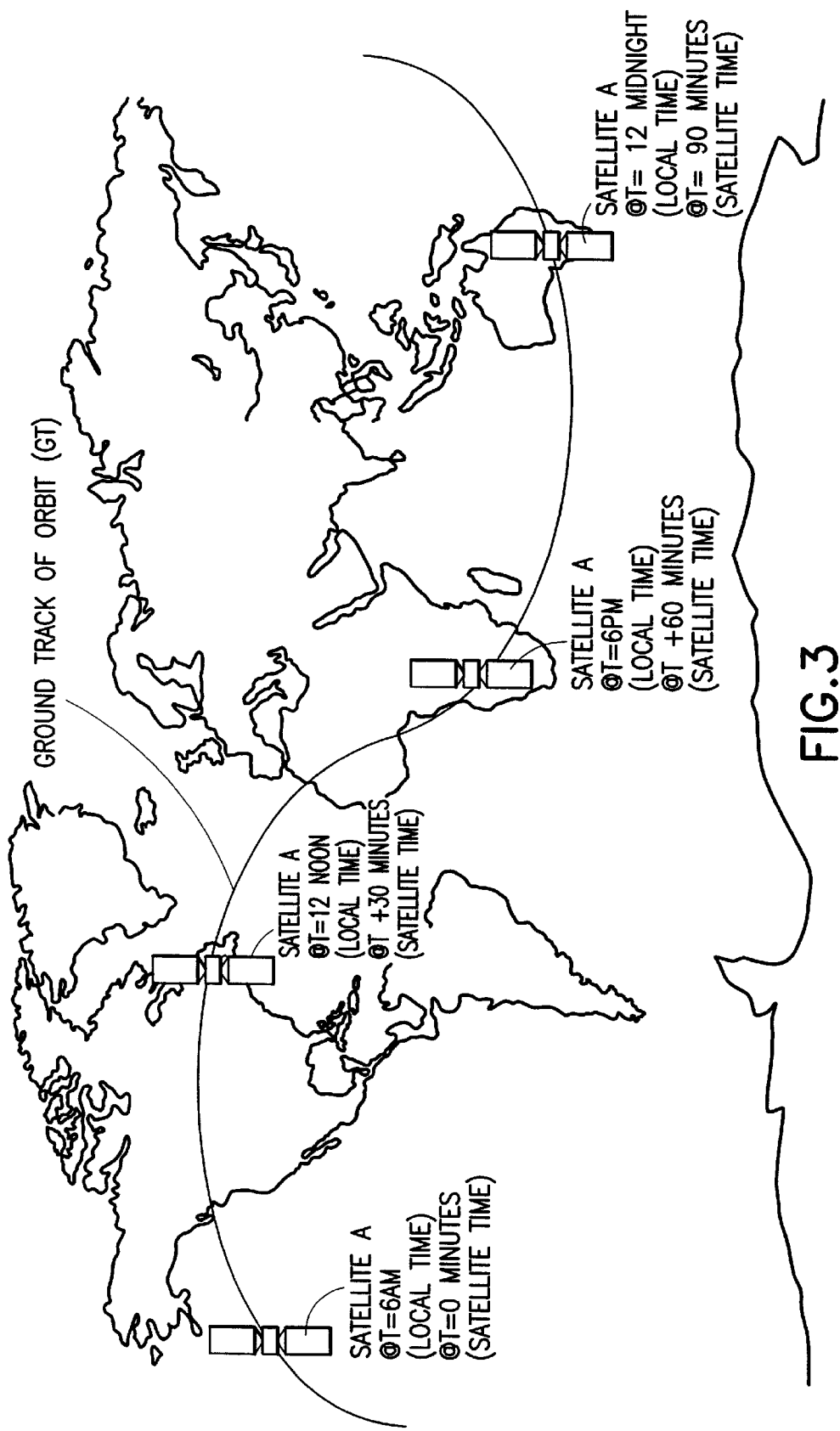
FIG. 3 illustrates an exemplary ground track (GT) of one orbit of one of the satellites of the satellite constellation of FIG. 2.

Consider now FIG. 3, wherein one satellite (A) of the constellation of satellites 40 is shown orbiting the earth in a circular orbit (not necessary for this invention, as elliptical orbits can be employed as well), at an altitude of about 750 nautical miles and an inclination of 52 degrees (the exact parameters of the orbit are not important with respect to this invention). It is noted that the ground track GT of the orbit takes the satellite A, within about two hours, through all time zones of the earth, including local morning, noon, evening, and midnight. For example, during one pass of the satellite A, the satellite could be entering the coverage area of the U.S.A. fully or nearly fully charged, and then passing out over the Atlantic ocean, briefly traversing Southern Africa in the evening, then crossing the Indian Ocean and covering Australia late at night. Since the orbital period of satellite A is about two hours, and the earth is rotating under the satellite constellation 41, the second pass of this same satellite A will be later in time at each point by about the two hour period of the orbit. Thus, in 48 local hours the satellite A will again be roughly over the same point at the same time. In between these times the satellite A will cover other regions.

Figure 4:
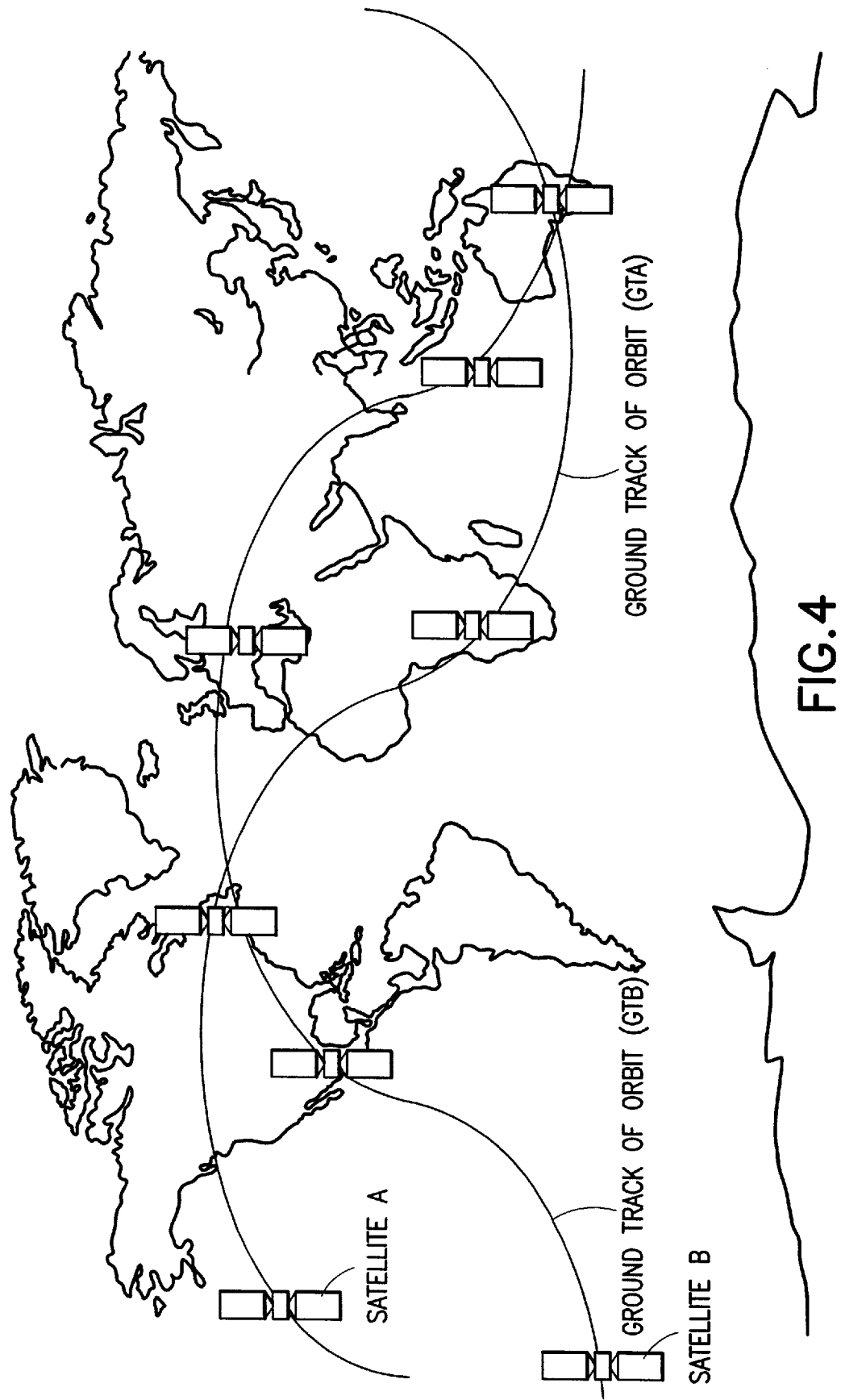
FIG. 4 illustrates an out of phase relationship in the ground tracks of one orbit of two satellites of the constellation.
Figure 5:
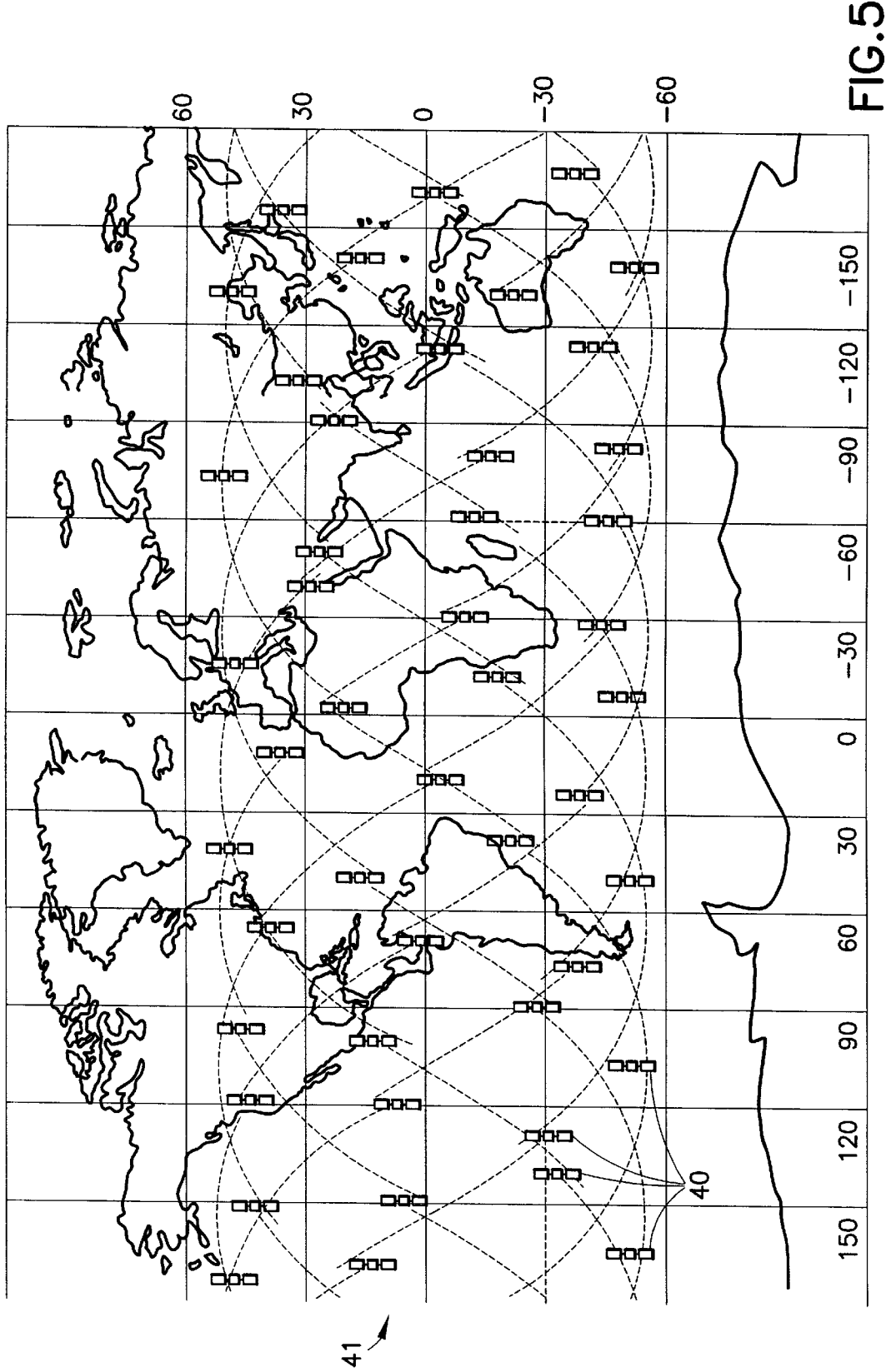
FIG. 5 depicts the ground tracks of one orbit for a forty eight satellite constellation, in accordance with a presently preferred but not limiting embodiment of the invention.

Considering now FIG. 4, a second satellite (B) of the constellation 41 of satellites 40 is also shown orbiting the earth in a similar circular orbit that is out of orbit phase with the first satellite A. The satellite B is also approaching North America, but from the South Pacific Ocean. The ground track of satellite B (GTB) takes it across the continental U.S.A., and then on to Europe, then India and thence to Australia. As with the ground track of satellite A (GTA), the satellite B covers various regions during the succession of orbits as the earth rotates under the constellation 41. As can be appreciated, other orbit paths of a large number of satellites in a typical constellation of satellites will operate to provide worldwide communications on a 24 hour basis. FIG. 5 shows a constellation of 48 satellites in a Walker 8/6/1 constellation 41, as is proposed for the GLOBAL-STAR™ satellite telecommunications system. Walker orbits (not necessary for this invention) have the ability to equally space satellites over the earth. Typically, there are N planes of X satellites 40 each, arranged with a phase difference between the first satellite in each plane equal to a constant. A typical constellation comprises eight planes of six satellites, with each plane spaced such that the ascending node of each plane is spaced 45 degrees from the adjacent plane. The planes are inclined at some inclination, in this example at 52 degrees. The first satellite 40 in each plane is rotated in phase with respect to the adjacent plane's first satellite by 7.5 degrees.

Figure 6:
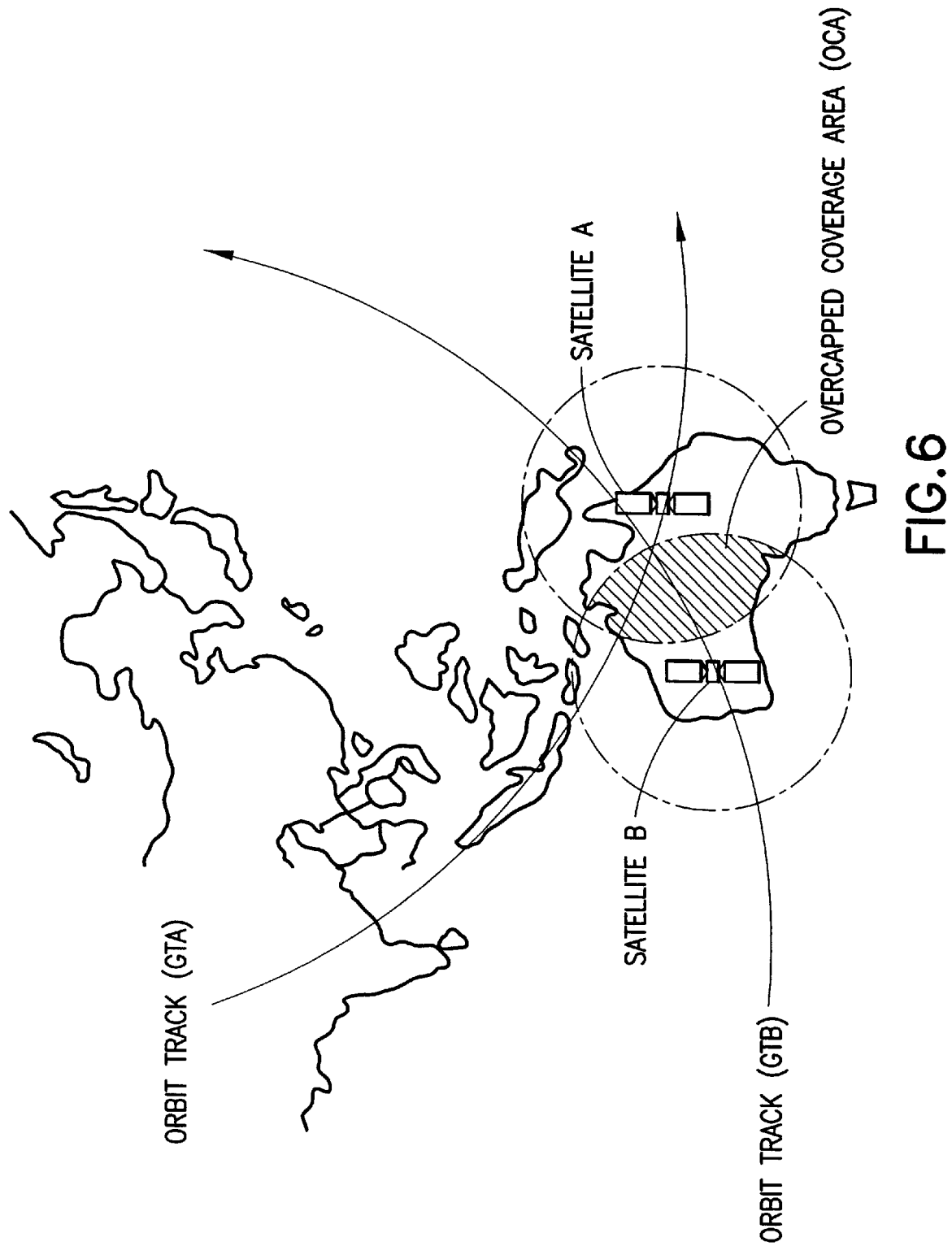
FIG. 6 depicts, at a particular instant in time, two intersecting ground tracks for two satellites providing service to a particular land mass, the satellites having an overlapped coverage area.

Consider now FIG. 6, which illustrates as an example two satellites A, B serving Australia. Typically three or more satellites may be covering this service area. The first satellite A has moved into position to serve Australia, having come from serving high traffic demand areas such as Indonesia, India, China and Russia just prior to the time that it is serving Australia. Assume for this example that the battery/solar array capability of satellite A, after being used in the previous service areas, is 25% of maximum. On the other hand, satellite B has also moved into position to serve Australia, but has arrived from lower traffic demand areas over Africa and the Indian Ocean. Assume further for this example that the battery/solar array capability of satellite B is 90% of maximum. As such, at the illustrated point in time the first satellite A is clearly in a low or lower state of power delivery status than the second satellite B.

Assume further that in the overlap coverage area (OCA) between satellite A and satellite B there is a demand for capacity that exceeds the total capacity of 25% of satellite A and 100% of satellite B. The teachings of this invention provide a technique to optimize the utilization of satellite A so that its power delivery capacity, when over Australia, exceeds the 25% of total power in the example cited.

Figure 7:
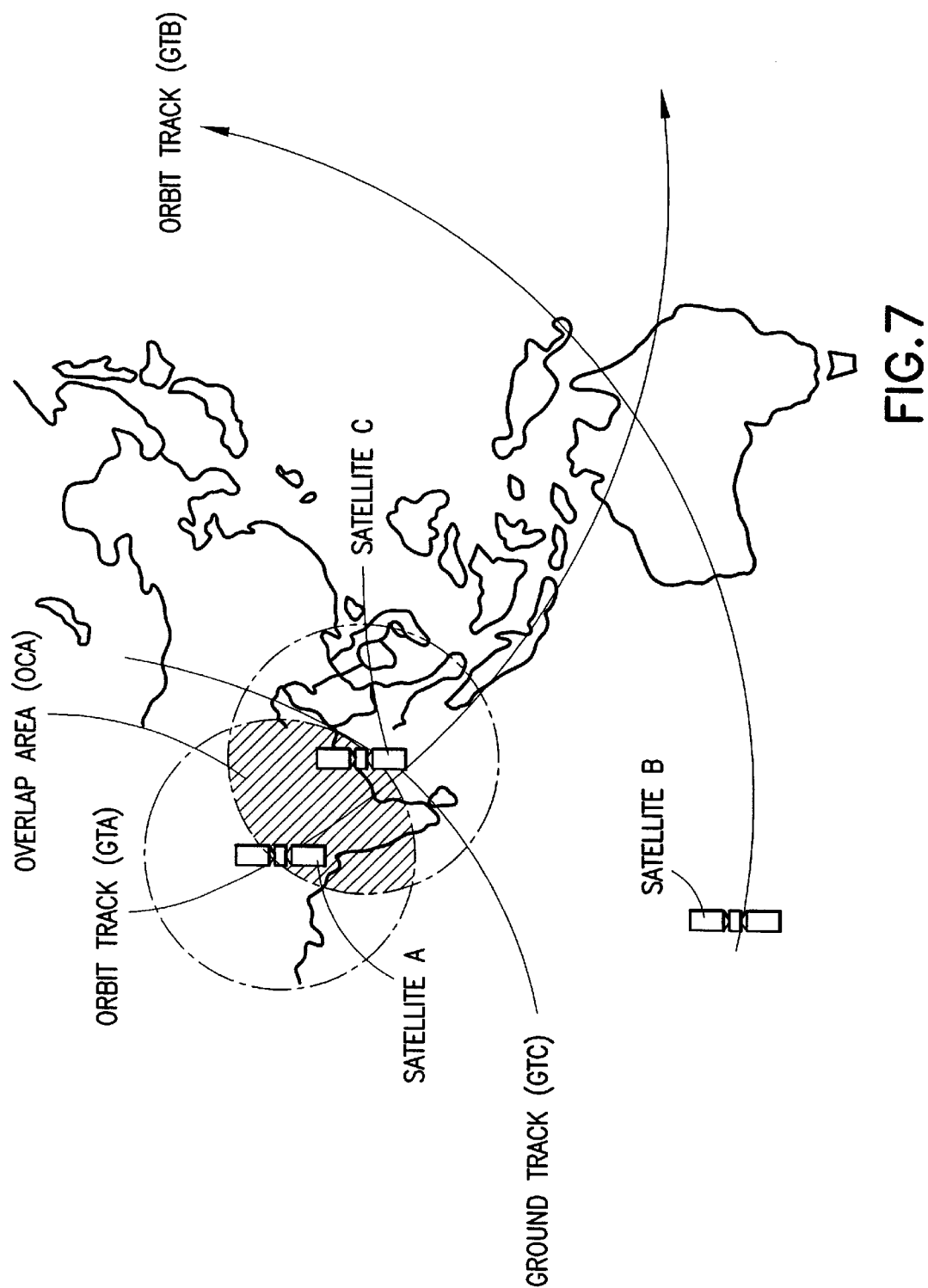
FIG. 7 illustrates the case depicted in FIG. 6 at an earlier point in time.

FIG. 7 depicts the orbital configuration a few minutes earlier than the one shown in FIG. 6. In this case satellite A (which is to be power optimized) is passing over India on its way to Australia. At the same time another satellite C is passing from the Indian Ocean over India and moving toward China. It is possible to take advantage of satellite C to minimize the use of satellite A such that when satellite A arrives over Australia it has more than 25% of its power available to create and maintain circuits.

It is an object of this invention to disclose an optimization apparatus and method for performing this satellite power optimization.

The satellite power optimization could be performed on a world wide scale, using simulations combined with the transmission of the information to and from the operating gateways 50. However, this technique may be inefficient and wasteful of system resources.

A preferred method is to automatically optimize in real time or near real time the satellite power utilization at each gateway 50, thereby providing satellite power only as necessary for closing communications links.

Figure 8:
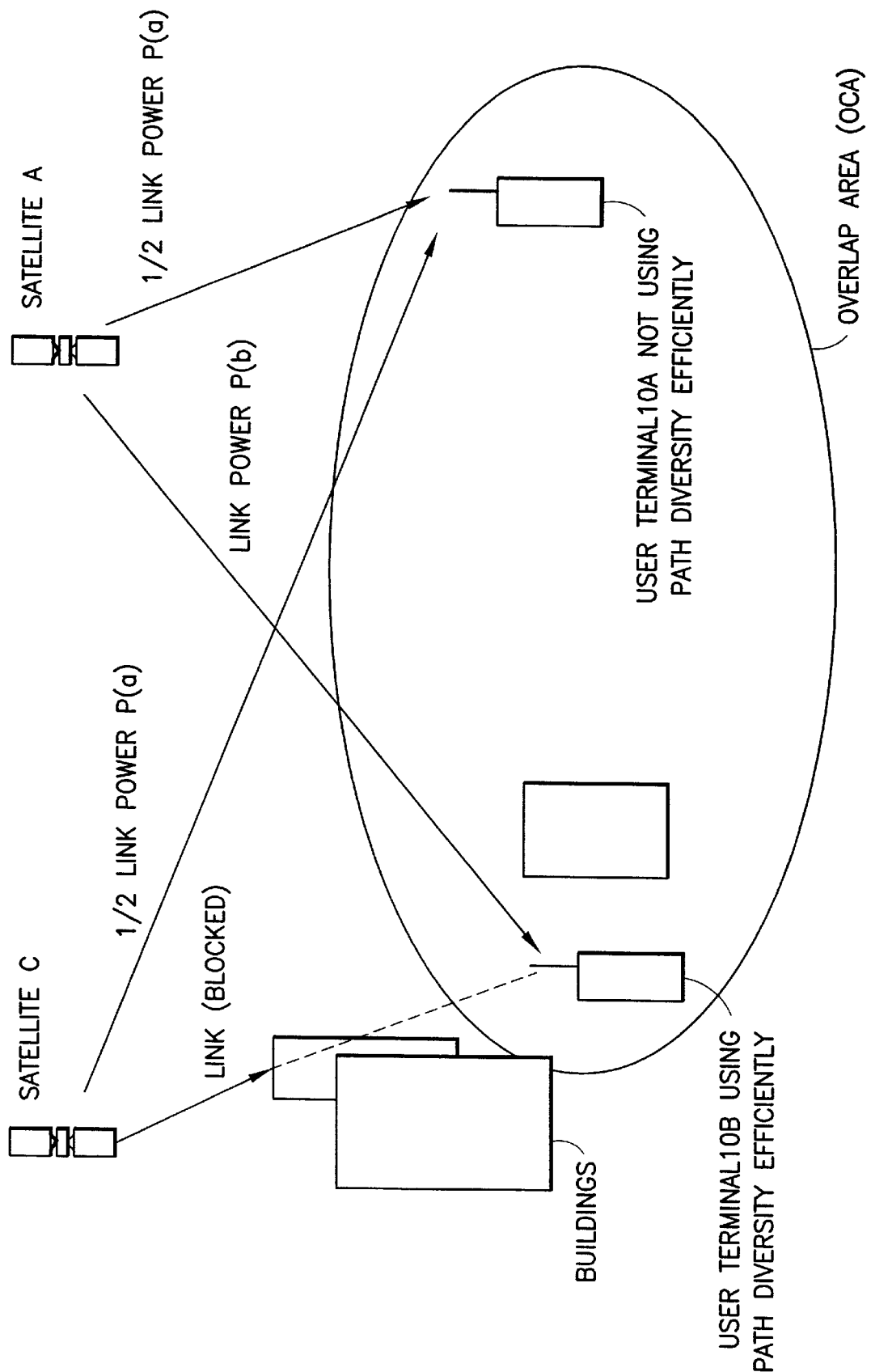
FIG. 8 illustrates two user terminals within the overlapped coverage area of two satellites, wherein one of the user terminals has a direct line of sight to both satellites for receiving a communication link from each, while the other user terminal has a clear line of sight to only one of the satellites, and is blocked to the other.

It is assumed that in the overlap area (OCA) of FIG. 7, user terminals 10 having RAKE receivers are deployed, as shown in FIG. 8. RAKE receivers allow multiple links or signal paths to be received by the receiver, thus combating blocking or fading on one of the paths. Reference in this regard can be had to, for example, U.S. Pat. No. 5,233,626, entitled "Repeater Diversity Spread Spectrum Communications System", by Stephen A. Ames, the disclosure of which is incorporated by reference herein in its entirety.

In reference to FIG. 8, it is assumed that some of these user terminals 10 will be in locations where fading and blockage requires a high degree of satellite path diversity, while other user terminals 10 will not be faded or blocked at all. In FIG. 8, two user terminals are shown. The first user terminal 10A is coupled to satellites A and C, with its required link power coming from each satellite with about one half the power necessary to obtain a sufficient received Eb/No to exhibit nearly error free reception. It should be noted that it is not necessary to split the power 50% and, indeed, generally the power is not evenly split. On the other hand user terminal B is located in an area with many obstructions (buildings, foliage, etc.) and has one of its paths blocked (the path to satellite C). In this case the total amount of the link power P(b) is supplied by only one satellite (satellite A).

However, it will be remembered with reference to FIGS. 6 and 7 that it was desirable to conserve power on satellite A, so that this satellite's capacity would be increased for that part of its exemplary orbital path that will carry it over Australia.

It can be appreciated that if path diversity were to be indiscriminately provided to the receivers, as the two satellite diversity is shown being provided to the non-blocked user terminal 10A, independent of the consequences on the power generation capability of the satellite repeater or its ability to deliver more capacity at a later time in another part of the world, then the power utilization and power consumption of the satellite constellation 41 will not be optimized.

In accordance with an aspect of this invention, a real time method of accomplishing the satellite constellation power optimization is provided. Returning to the example of FIG. 8, consider the user terminal 10A and the desired future use of satellite A in Australia. A preferred system optimization in this case includes the steps of denying user terminal 10A the use of the power from satellite A (½ link power P(a)), and instead using satellite C to provide the link at full power P(a). While ON/OFF control is described, proportional power control could be utilized, whereby each satellite repeater carries a portion (variable) of the total power to be delivered to the UT. This has the effect of reducing the amount of power used by satellite A, and increasing the power used by user terminal 10A on satellite C. Since the predicted demand for service from satellite C is low (due to its future orbital path), the additional power consumption required to now service user terminal 10A at the higher power level will have little impact on the ability of satellite C to meet its capacity obligations later in the orbit. On the other hand, the reduction in the power demanded from satellite A over India conserves and thus increases the percentage of satellite power available to service subscribers in Australia some minutes later, which is the desired result.

Figure 10:
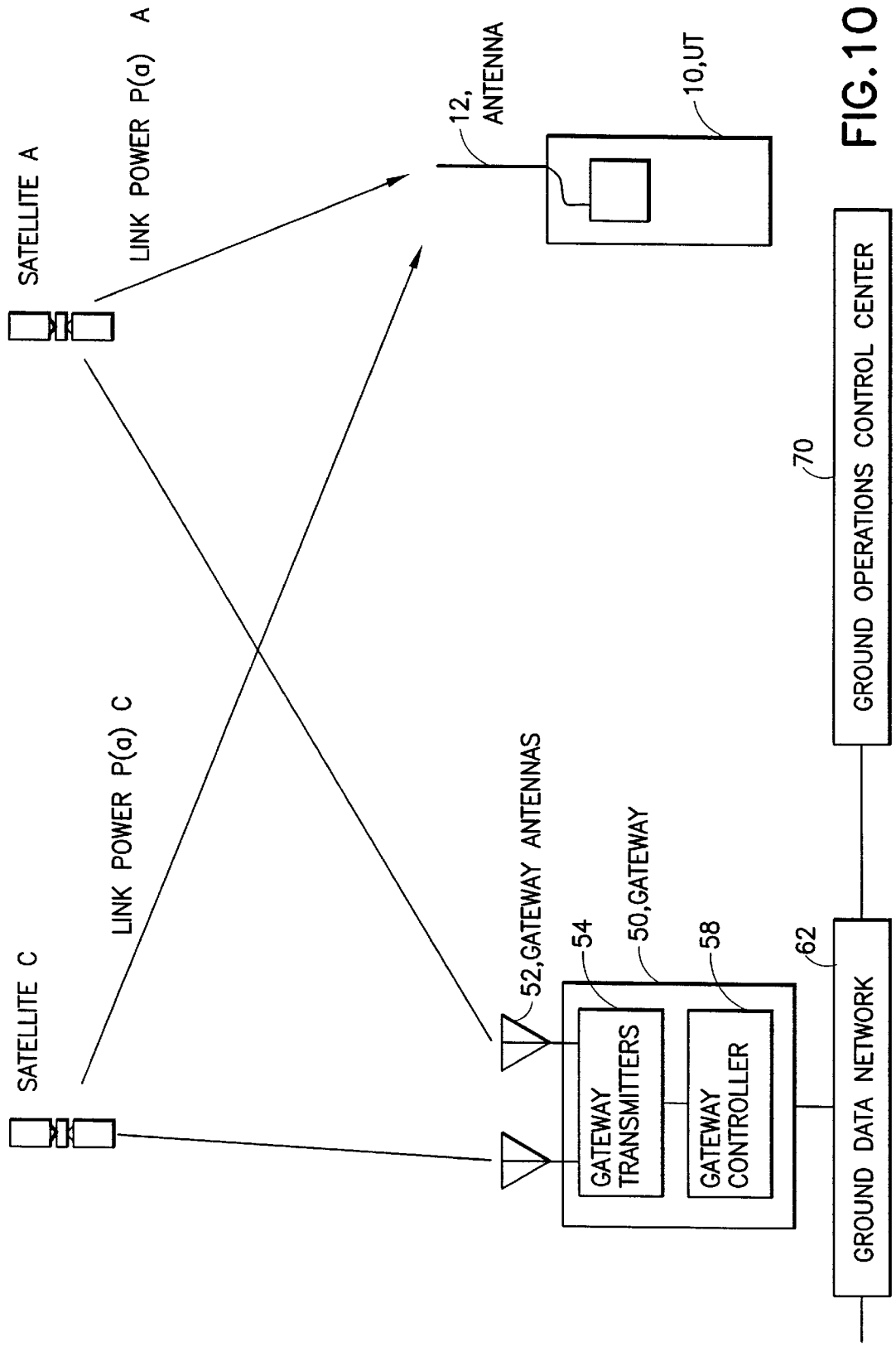
FIG. 10 shows the overall satellite communication system, including a ground operations control center (GOCC)
Figure 11:
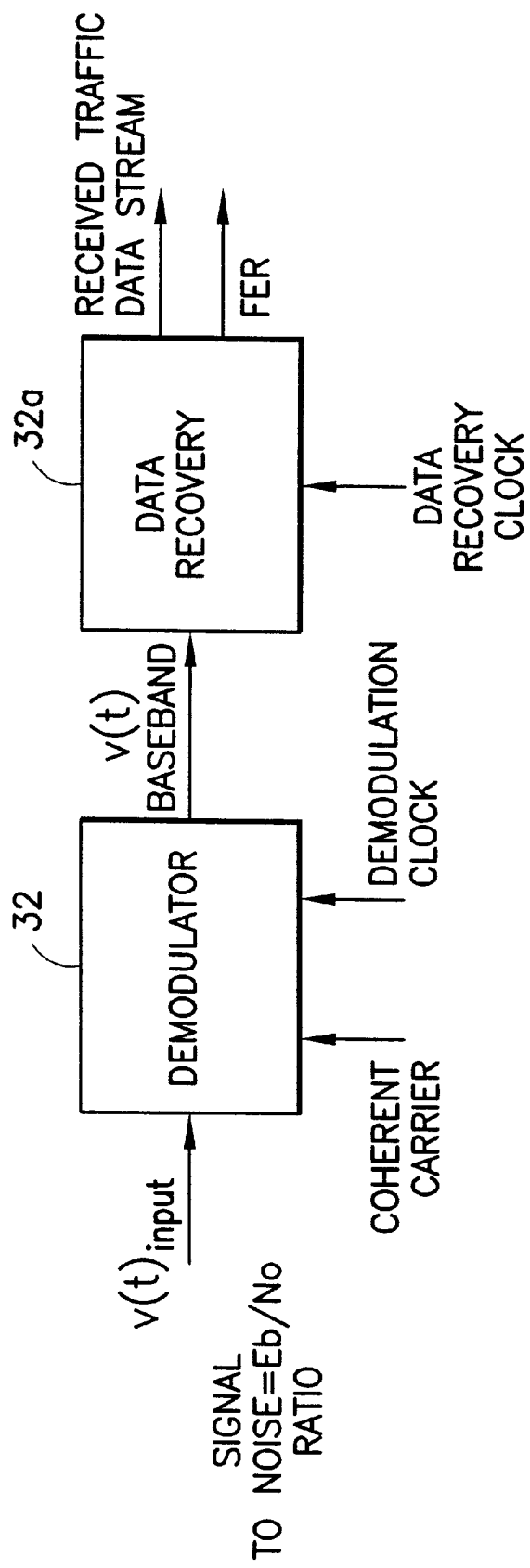
FIG. 11 is a block diagram of the demodulator and data recovery blocks of the user terminal of FIGS. 1, 9 and 10.
Figure 12:
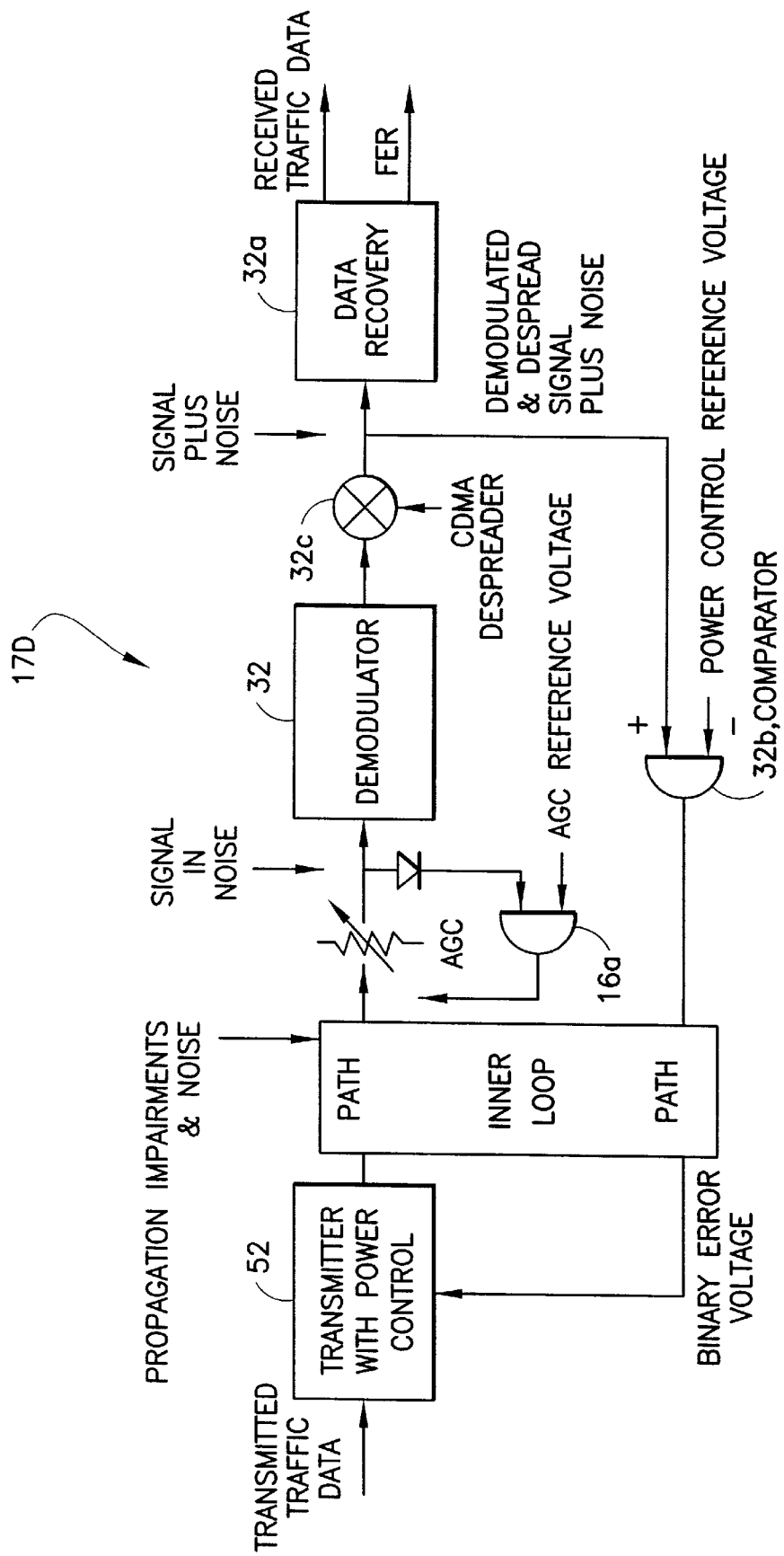
FIG. 12 is a block diagram of the AGC and power control inner loop of the user terminal of FIGS. 1, 9 and 10.

Overall planning for the use of optimization and the necessity for it preferably originates at the Ground Operations Control Center (GOCC) 70 shown in FIG. 10. Commands to enable, disable, or limit the use of the real-time optimization are transmitted from the GOCC 70 to the gateways 50 over the GDN 62.

Figure 9:
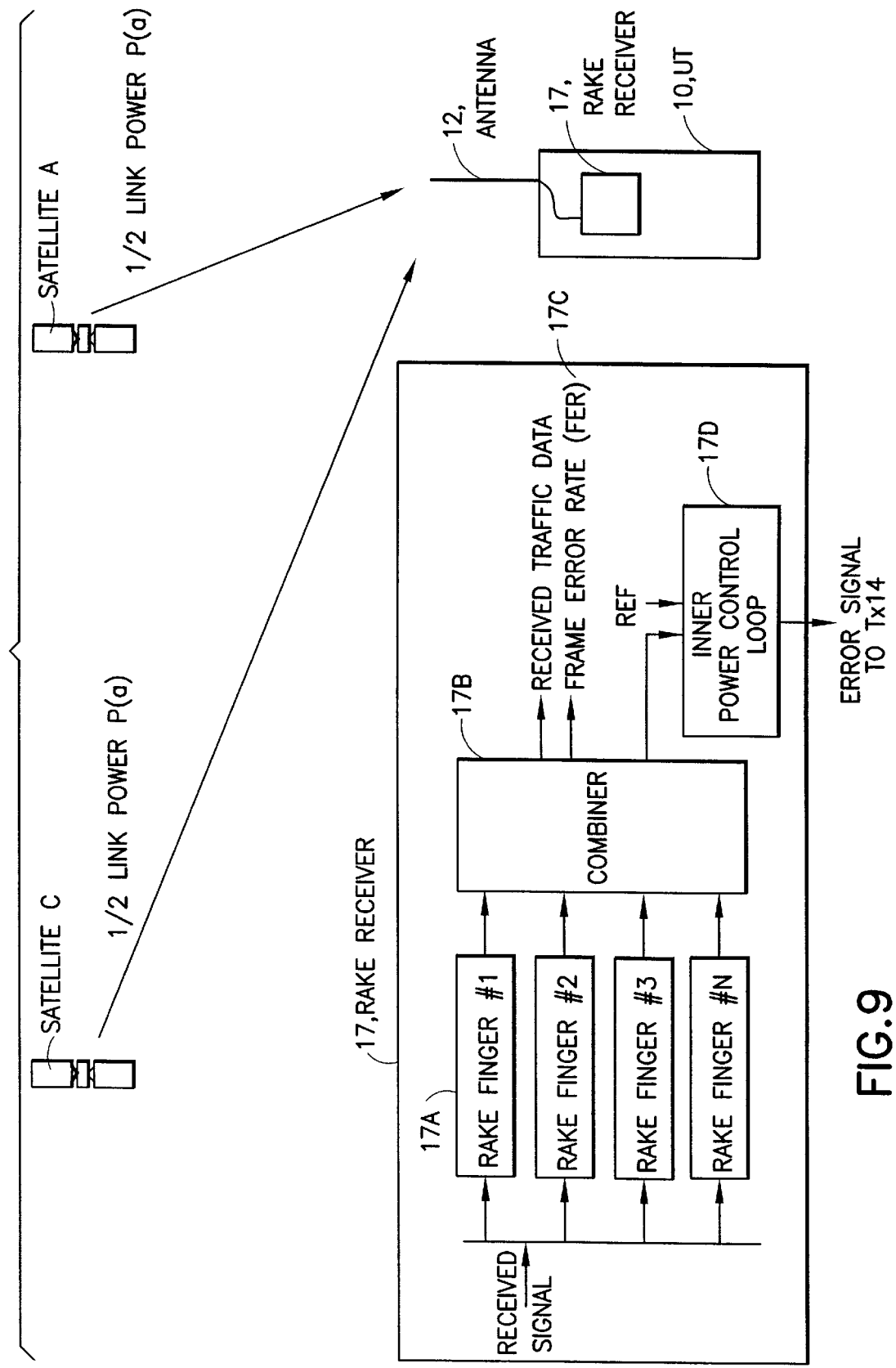
FIG. 9 illustrates in greater detail one of the user terminals of FIG. 8, and shows a preferred RAKE receiver portion of the user terminal.

As is best shown in FIG. 9, the user terminal (UT) 10 includes a multiple finger RAKE receiver 17 that includes a plurality (1–N) fingers 17A. Each finger 17A can be operated independently of the other fingers, and each can synchronize to and track a CDMA transmission from a different one of the satellites 40. The RAKE receiver 17 actually forms a part of the demodulator 32 shown in FIG. 1. Transmissions from various satellite repeaters 10 are directed towards antenna 12 and conducted to the receiver 17 and applied to the RAKE fingers 17A. The outputs of the RAKE fingers 17A are directed to a combiner 17B where, for example, the signals are time aligned using data transmitted from the gateway 50. The output of the combiner 17B is data (e.g., digitized voice or other data format) and Frame Error Rate (FER) data 17C.

In general, the demodulation and data recovery processes in the receiver 17 convert the input signal to traffic data. In these processes, the input Eb/No and FER 17C are calculated. Three control loops maintain: (1) the noise level (AGC loop), (2) the signal level (inner power-control loop), and (3) the FER (outer power-control loop). Reference in this regard can also be had to FIGS. 12 and 13.

Figure 13:
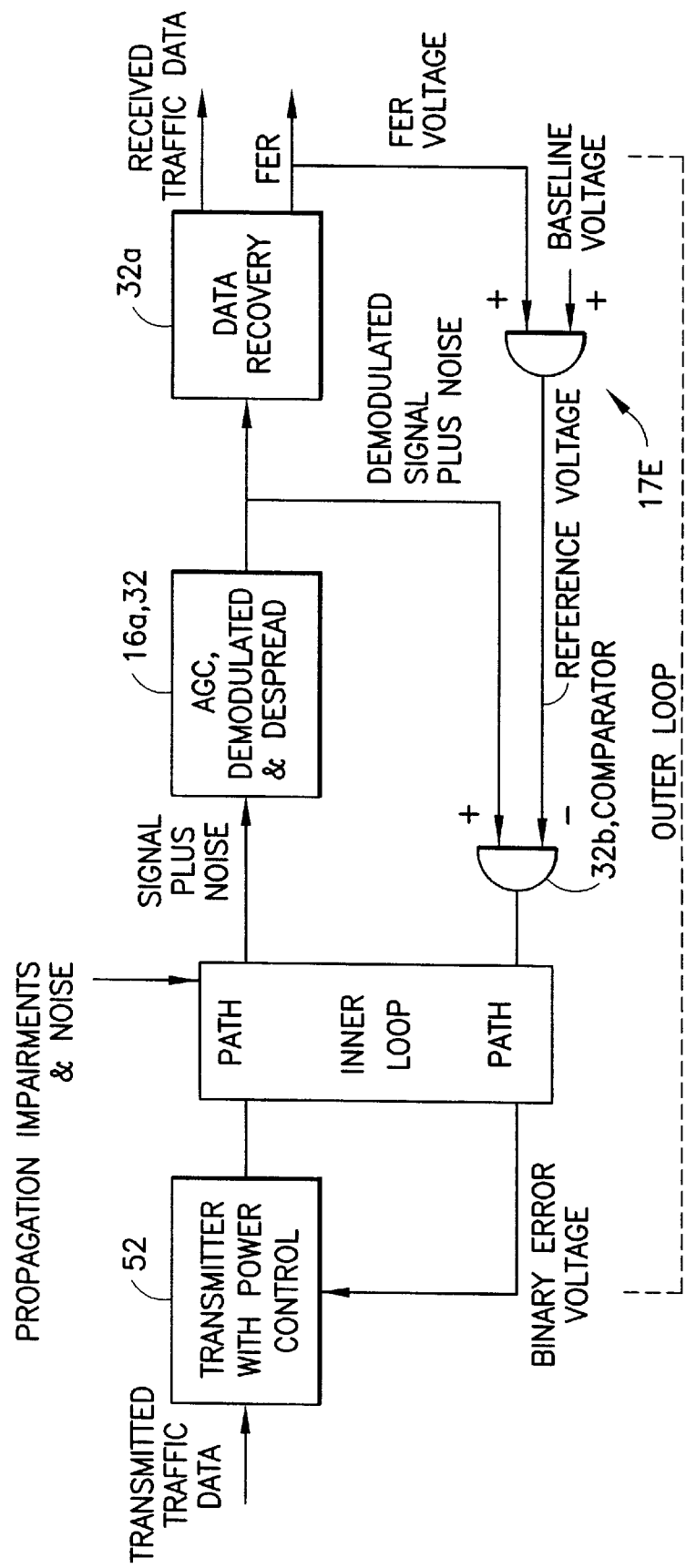
FIG. 13 is a block diagram of a power control outer loop of the user terminal of FIGS. 1, 9 and 10.

In each direction of transmission, the closed-loop power control actually contains two control loops. One of these loops is referred to as the "inner loop" (FIG. 12), while the second is referred to as the "outer loop" (FIG. 13). The AGC loop in the receiver front end is a third loop which is also considered. This invention does not describe with any particularity the control loop parameters, e.g., gain and bandwidth, nor the selection and optimization of these parameters, as these are typically application specific.

The demodulator 32/data recovery block 32a (see FIG. 11) is at the heart of the receiver. The input signal coming from the receiver 16 is in analog format, after being transmitted over a path with a limited bandwidth and with propagation impairments. Within the demodulator 32, the input RF (or more accurately IF) signal waveform is converted to an output baseband signal, which remains in the form of an analog signal level with added noise. To perform the demodulation process, the input signal is compared (1) to precise frequency/phase references (2) at precise timing intervals which are separately recovered from the reception of a pilot signal. These operations are performed in the RAKE receiver 17. Demodulation is performed at, for example, a 1.25 Mbps rate (chip rate).

The demodulated baseband signal is further processed by the data recovery circuits 32a to reproduce the traffic data stream. Within the data recovery circuits 32a the input baseband signal waveform is converted to an output data stream, but the added noise voltage can occasionally confuse the data recovery process and erroneous bits will be output. To perform the data recovery process, the baseband signal is compared (1) to decision voltages (2) at precise timing intervals.

The analog input to the demodulator 32 is a summation of a signal component and noise components. The demodulator input is a time-varying voltage which is the summation of these signals.

$$v(t)_{Input} = v(t)_{Signal} + v(t)_{Noise}$$

This voltage summation is instantaneous and can be directly measured and displayed on an oscilloscope. It is convenient to refer to the ratio of the input signal to noise as a figure of merit.

$$S/N \text{ (dB)} = 20 \log_{10}\left(\frac{v_{Signal}}{v_{Noise}}\right) = 20 \log_{10}(v_{Signal}) - 20 \log_{10}(v_{Noise})$$

The terms $v_{Signal}$ and $v_{Noise}$ are rms (root mean square) values determined over a statistically long period of time. The denominator term, $v_{Noise}$, is the standard deviation, $\sigma$, of the noise voltage. This figure-of-merit ratio cannot be measured directly.

Eb/No is a form of the signal-to-noise ratio at the input to the data recovery process, and is a fundamental figure of merit of a particular digital modulation waveform. Eb is the signal energy per bit, which is the signal power divided by the data rate. No is the noise energy in a one Hertz bandwidth. The use of this normalized form of the signal-to-noise ratio allows comparisons of modulation waveforms without reference to data rate and bandwidth.

At the output of the demodulator and data recovery process, the BER (Bit Error Rate) is a digital measure of signal-to-noise, or more accurately, the number of erroneous (noise) bits per the total number of bits. If the input noise is well-behaved, AWGN (Additive White Gaussian Noise), a unique BER versus Eb/No curve can be determined accurately.

In CDMA receivers, of the type of most interest to the preferred embodiment of this invention, the FER (Frame Error Rate) is used instead as the measure of output fidelity. The FER can be measured directly in the receiver chain because each frame is tagged with a frame quality or fidelity indicator. A typical frame is of 20 milliseconds duration, but can be longer or shorter. As an example, each frame can contain from a single bit (50 bps idle rate) to 192 bits (9600 bps). The preferred values of Eb/No used are those that produce a FER of 1%.

Given that signal and noise voltages are additive, to maintain the FER at 1%, while overcoming an increase in signal level, it is necessary to decrease the transmitted signal. This normally requires the presence of negative feedback. Conversely, to overcome an increase in noise level it is necessary to increase the transmitted signal. To resolve this matter, one may separately detect (1) signal variations and (2) noise variations. Two separate detectors are thus the inputs to the AGC loop and the inner power-control loop.

The received RF (more accurately IF) signal is processed by the AGC (Automatic Gain Control) circuit 16a, which insures that the aggregate signal processed by the demodulator is maintained at a relatively constant level.

Prior to CDMA despreading 32c, the aggregate signal is effectively all noise, with the weak signal imbedded within the noise (i.e. the true signal to noise ratio is less than unity or negative in dB). Therefore the AGC 16a controls the noise level.

The noise typically includes: (1) upstream noise generated by the far-end gateway transmitter 54 and the satellite 40, (2) external noise picked up by the antenna 12, (3) CDMA self-interfering noise from other users of the same frequency channel, and (4) receiver 16 front-end noise.

Prior to being input to the data recovery process, the CDMA despreading circuit 32c extracts the desired signal from the noise (i.e. the true signal to noise ratio following despreading is greater than unity or positive in dB). As a result, at the input to the data recovery circuits 32a, the noise level is controlled by the AGC 16a, but the level of the specific signal is not controlled by the AGC 16a.

The inner power control loop detector 17D (FIG. 9 and FIG. 12) detects the combined signal-plus-noise level at the output of the CDMA despreader 32c. A comparator circuit 32b continuously contrasts the baseband voltage level to a reference level, which may be sometimes referred to as the "set point" and the "power point". The binary output of this comparator circuit is quantized to one value when the signal-plus-noise level is above the reference level and to a second value when the input level is below the reference level. This binary error signal is fed back to the far-end transmitter (e.g., the gateway transmitter 54) to a power control circuit which raises or lowers the transmitter power in, by example, 0.25 dB steps based upon the value of the binary error signal. The data rate of this fed-back binary error signal is preferably once per frame (20 ms), although other periods could be used.

In that the signal is greater than the noise level, and the noise level is held constant by the AGC 16a, the inner power-control loop 17D effectively controls the signal level and provides a direct indication of the signal-to-noise ratio, i.e, Eb/No.

Upon detecting an increase in the spread, aggregate RF input noise, the AGC 16a calls for a decrease of Z dB in gain to maintain "No" constant. The AGC decrease of Z dB in "No" also decreases the embedded Eb by Z dB, which then must be compensated with an increase of Z dB by the inner power-control loop 17D. Ideally this dual-loop arrangement would maintain the Eb/No ratio at that required for a FER of 1%. The inner power control loop travels the satellite/terminal path in both directions, and is thus subject to twice the satellite-to-terminal path delay.

If the input noise would always be AWGN (All White Gaussian Noise), there would be no need to consider an increase of Eb/No in calculating link budgets, because the ratio of the signal divided by the total noise at the input to the demodulator 32 is to be maintained constant at the value which achieves the desired FER=1% fidelity.

However, as a conceptual convenience in calculating link budgets, the required increase in signal level can be referred to as an increase in Eb/No, which is an apparent contradiction since an increase in Eb/No would seem to lead to a decrease in FER to below the 1% objective.

Therefore, those propagation impairments which cause slow signal level variations, which can be controlled by the inner power-control loop and do not add noise, are preferably included in the path loss, preferably as variations in Eb which are controlled by the inner power control loop 17D.

It is noted that slowly varying signal strength impairments, to be compensated by the inner power control loop 17D, include specular reflection, slowly varying hand-held user terminal antenna pattern, head blockage, and building diffraction, while noise level variations to be compensated by the AGC 16a include, by example, other CDMA signals in the same frequency channel, and uncoordinated foreign interference with a slowly varying Gaussian distribution.

Those propagation impairments which cause rapid noise level variations which are not completely controlled by the AGC 16a, and rapid signal level variations which are not completely controlled by the inner power-control loop 17D, effectively increase the FER. The AGC 16a and the inner power control loop 17D cannot generally operate on their own, in the presence of non-Gaussian noise, to maintain the FER at 1%.

As the AGC operation has been described above, when the foreign interfering noise is slowly-varying Gaussian, adding Gaussian noise to Gaussian noise produces Gaussian noise (of course with an increase in standard deviation). In that case the AGC 16a operates to maintain the noise into the demodulator at a constant level.

However, if the signal is contaminated by a number of weaker images of itself which are arriving at various relative amplitudes and phases (multipath), the AGC 16a will not readily detect the diffuse reflection components, since these components are relatively weak compared to the total noise prior to CDMA despreading.

Since the diffuse reflection components are images of the signal, the CDMA despreader 32c will not discriminate them from the direct signal component, and their levels will be enhanced relative to the remainder of the noise, along with the desired direct signal. Following despreading, the summation of these diffuse reflection images with the direct signal causes the signal level to vary rapidly. The amplitude distribution of the summation of these components is Rician, not Gaussian, with a direct-signal-to-diffuse-components ratio of K. The inner power-control loop 17D will typically not be capable of tracking and controlling these rapid variations. The result causes the Eb/No-to-FER conversion curves to be parametrically dependent upon the Rician K factor, i.e, distinct Eb/No-to-FER curves for each K-factor value are implied in order to accurately describe demodulation and data recovery.

These non-Gaussian variations can be aggregated in the increase in Eb/No in the link budgets. This so called "increase" in Eb/No could be treated as a "Y factor". However it may be just as proper to refer in the link budgets to "increases in Eb/No" for those conditions when it is required to increase Eb to overcome non-Gaussian (e.g., Rician) distributed noise components.

Signal level impairments which are relatively slowly varying (e.g., <1 Hz) are tracked by the inner power control loop 17D. On the other hand, signal level impairments which are relatively rapidly varying would not be completely controlled by the AGC 16a and the inner power control loop 17D, and some other mechanism is required.

Those rapidly varying signal strength impairments which are most probably not compensated by a combination of the AGC 16a and the inner power control loop 17D include tree (foliage) shadowing and diffuse reflections, while the noise increase impairment which is most probably not compensated for by the combination of the AGC 16a and the inner power-control loop 17D includes uncoordinated foreign interference having a rapidly varying or non-Gaussian distribution.

Referring to FIG. 13, a purpose of the outer power-control loop 17E is to maintain the FER at some desired value, such as 1%. It is noted that a FER better than about 1% would actually be a waste of satellite power, while a FER worse than about 1% would produce unacceptable signal fidelity. The FER is measured at the output of the data recovery process. Each frame of the transmitted format contains a CRC (Cyclical Redundancy check) field, where the number of CRC bits is dependent upon the number of traffic data bits in the frame. The CRC field is also called the "Frame Quality (fidelity) Indicator".

The Frame Error Rate is a measure of the noisy data present with the signal data. More precisely, the FER is a measure of imperfect demodulation, where imperfections may be the result of noise, interference, or distortion.

If the FER increases due to an increase in the non-Gaussian noise, a proportional error voltage is developed. This FER error voltage is added to a baseline voltage, and this sum is fed back to the comparator 32b at the output of the demodulator 32 to be used as the reference for the inner power control loop 17D. Therefore, (1) an increase of non-Gaussian input noise causes, (2) an increase of output FER which (3) raises the reference level, which in turn (4) commands a compensating increase in the far-end transmitter power (e.g., the gateway transmitter 54) in order to (5) raise the input signal level (Eb) to the demodulator 32 to the level required to produce a FER of 1%.

The power control outer loop 17E also travels the satellite-terminal path in both directions, and is also subject to twice the satellite-to-terminal path delay. The power control outer loop 17E is preferably constrained to be two orders of magnitude slower than the power control inner loop, although other relationships between the two can be used as well.

It is noted that rapidly varying signal strength impairments are additionally corrected by a combination of interleaving, Forward Error Correction (FEC) coding, and transmitted signal power margin.

Referring now to FIG. 10, a method of optimizing the utilization of the constellation 41 is shown. Signals are sent from a gateway antenna 52 to user terminals 10 via satellite repeaters 40. There may be multiple repeaters generating multiple signal copies. An optimization of how many satellite repeaters 40 are used to serve the user terminals 10 is made in the following manner. The Ground Operations Control Center 70 determines that there is sufficient reason to enable the system optimization hardware and software in a particular gateway 50. This can be determined based on, for example, knowledge of the future locations of satellites 40 relative to concentrations of user terminals, as well as on current and/or predicted demand for satellite repeater capacity at the future locations). The gateway 50 may be one of a large number of gateways under the control of the GOCC 70. A command is formulated by the GOCC 70 and transmitted to the Gateway 50 by way of the Ground Data Network 62. The gateway controller 58 receives the command and operates to enable the optimization.

There are two preferred methods to implement the optimization of the forward link (gateway 50 to user terminal 10 via a satellite 40). The first method assumes reciprocity of the forward and reverse links to and from the user terminals 10. Since this invention considers macro information concerning the condition of the user's immediate RF propagation environment, it is practical to make an assumption that if the return link is being corrupted, the forward link is as well. For example, a building that obstructs the user terminal's line of sight to a particular satellite will impair the forward and the reverse links about equally, regardless of any difference in frequency between the two links (e.g., S-band vs. L-band.) As such, in this method the gateway 50 makes an assumption concerning the FER of the forward link to the user terminal 10, based on the signal quality (such as the FER) of the reverse link transmissions from the user terminal 10. It is assumed that the gateway 50 can include somewhat similar receiver circuitry to that described above in FIGS. 11–13, and is thus capable of obtaining the FER of the reverse link.

It should be kept in mind that the optimization system is not attempting to quickly modify the user terminal's diversity to compensate for rapid changes in the user terminal's propagation, but instead preferably analyzes the past few seconds of transmitted data for making decisions regarding the user terminal's current and near term need for diversity.

The second method employs the user terminal 10 to measure the corruption directly from the forward link, and to transmit data expressive of the forward link quality to the gateway 50 for processing in the gateway controller 58, in order to make the decision on diversity.

The process is the same, in general, for both methods. Assuming the case of the second method, the FER of the UT 10A (see FIG. 8) is measured and tracked for a period of time. If the FER does not exceed a value of B for a duration of T seconds, a signal is formatted and sent to the controller 50 indicating that the user terminal 10A is a candidate for diversity reduction. The gateway controller 58, after computing which satellite 40 to put the user terminal onto, and which user terminal to deny the diversity path, chooses one or more "best" path(s) according to an optimization program and information provided by the GOCC 70. Aggregations of user terminals 10 may, in this manner, be directed to a satellite 40 that is located at a more optimum position for balancing the load on all of the constellation. In the example of FIG. 8, the GOCC 70 would inform the gateway 50 that it was desirable to conserve power on satellite A more so than on satellite C, and the gateway 50 would then take these criteria into consideration in making diversity decisions regarding the user terminals 10A and 10B.

In order to measure the corrupted frames one need only count corrupted frames and compare the value to stored values for that user for the last few seconds of transmission. In this manner diversity can be applied, denied, and reapplied according to the needs of the individual users on the system. For example, assume that a user terminal 10 has started a call, and assume further that a call start-up algorithm requires that diversity be applied to all user terminals indiscriminately at call initiation. The user terminal 10 is transmitted to with about ½ the power on satellite A and about ½ the power on satellite C (see FIG. 10). Next, a few seconds (adjustable) of FER data is gathered. After this initial data acquisition period a timer is started and a comparison with a reference of value is made. As long as the FER is greater than the reference value, the diversity operation is maintained, or the level of diversity is maintained. When the FER falls below the threshold for some predetermined length of time, a signal is formatted which removes or reduces the level of diversity (thus saving the power on the desired satellite(s)). As long as the FER remains at the reduced level, the diversity is reduced. Once the level of FER increases above the threshold for a predetermined length of time, the gateway controller 58 reapplies the diversity in order to increase the probability of the user terminal 10 maintaining communications.

It is noted that for the case where the user terminal transmit antenna 12 is an omni-directional antenna, the transmissions from the user terminal 10 will typically be received and repeated by all satellites 40 (e.g., satellite A and satellite C) that can be "seen" from the user terminal 10. That is, the user terminal transmissions will be present in all of the forward downlinks (feeder downlinks) from the satellites 40 to the gateway 50, and will be received at the corresponding ones of the antennas 52. However, unless diversity is enabled, the gateway 50 will ignore the user terminal's signals in all feeder downlinks except for the one associated with the one serving satellite 40 (e.g., satellite A). Conversely, when diversity is disabled the gateway 50 will use only one antenna 52 to transmit the signal to the user terminal 10 in only one of the feeder uplinks, while when diversity is enabled the gateway 50 will transmit the signal to the user terminal 10 in two or more of the feeder uplinks, via the corresponding two or more satellites 40 being tracked by the gateway's steerable antennas 52.

It should be noted that while the gateway 50 may be privy to the satellite ephemerides tables, and may be well able to calculate the future orbital locations of the various satellites 40, the gateway 50 may not be privy to the state of charge of the batteries of these satellites (which may be relayed via a telemetry link to the GOCC 70 directly or via an unillustrated Satellite Operations Control Center (SOCC)). The gateway 50 also may not be aware of the current demand for satellite circuits at a calculated future location of the satellite (s), nor may it be capable of predicting, based on some stored historical record, what the demand for circuits will be at the calculated future location. As such, the use of the GOCC 70 as a unifying master control center is advantageous and is preferred when optimizing the constellation power and capacity in the MSTS 1, that is comprised of a number of gateways 50, possibly operated by different competing entities, that are distributed around the earth. However, it is pointed out that the teachings of this invention can be applied as well in a more distributed control system wherein individual interconnected and cooperating gateways operate in a more autonomous manner.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a mobile satellite telecommunications system, comprising steps of:
   providing a user terminal that is operable to simultaneously receive a communication signal from a ground station via a plurality of satellites; and
   at the ground station, selectively transmitting the communication signal to one satellite or a plurality of satellites each having a coverage area that includes a current location of the user terminal; wherein
   said step of selectively transmitting comprises a step of considering a plurality of factors, comprising a current reception state of the user terminal, a current state of satellite power of at least one of the plurality of satellites, and a predicted required state of satellite power of the at least one satellite.

2. A method as in claim 1, wherein the current reception state of the user terminal is indicated by a received signal quality indicator.

3. A method as in claim 1, wherein the current reception state of the user terminal is indicated by a CDMA Frame Error Rate.

4. A method as in claim 1, wherein the current reception state of the user terminal is indicated by a Frame Error Rate (FER) that is determined in the user terminal from a forward link transmission, and further comprising a step of sending an indication of the FER to the ground station using a reverse link transmission.

5. A method as in claim 1, wherein the current reception state of the user terminal is indicated by a Frame Error Rate (FER) that is determined in the ground station from a reverse link transmission from the user terminal.

6. A method as in claim 1, wherein the current reception state of the user terminal is indicated by a value of a Frame Error Rate and a relationship of this value to previous values of the Frame Error Rate.

7. A method as in claim 1, wherein the current reception state of the user terminal is indicated by a Frame Error Rate (FER), wherein if the FER increases above a threshold level the number of selected satellites is increased, and wherein if the FER decreases below the threshold level the number of selected satellites is decreased.

8. A method as in claim 1, wherein the current reception state of the user terminal is indicated by a Frame Error Rate (FER), wherein if the FER increases above a threshold level, and the communication signal is being transmitted through a plurality of satellites, power is controlled proportionately on individual ones of said plurality of satellites to optimize the power resources of said plurality of satellites.

9. A mobile satellite telecommunications system, comprising:

a constellation of non-geosynchronous orbit satellites;

at least one gateway comprising a plurality of transmitters and receivers; and at least one user terminal comprising a transmitter and a receiver comprising circuitry operable for simultaneously receiving a communication signal from said gateway via a plurality of said satellites;

wherein said gateway comprises a controller for selectively transmitting the communication signal to one of said satellites or to a plurality of said satellites, each having a coverage area that includes a current location of said user terminal; and wherein said gateway controller considers a plurality of factors for selecting which satellite or satellites to transmit the communication signal to, comprising a current reception state of said user terminal, a current state of satellite power of at least one of said plurality of satellites, and a predicted required state of satellite power of said at least one satellite.

10. A system as in claim 9, wherein the current reception state of said user terminal is indicated by a received signal quality indicator.

11. A system as in claim 9, wherein the current reception state of said user terminal is indicated by a Frame Error Rate.

12. A system as in claim 9, wherein the current reception state of said user terminal is indicated by a Frame Error Rate (FER) that is determined in said user terminal from a forward link transmission, wherein said indication is input to said user terminal transmitter and is sent to said gateway using a reverse link transmission.

13. A system as in claim 9, wherein the current reception state of said user terminal is indicated by a Frame Error Rate (FER) that is determined in said gateway from a reverse link transmission that is received from said user terminal.

14. A system as in claim 9, wherein the current reception state of said user terminal is indicated by a value of a Frame Error Rate and a relationship of this value to previous values of the Frame Error Rate.

15. A system as in claim 9, wherein the current reception state of the user terminal is indicated by a Frame Error Rate (FER), wherein if the FER increases above a threshold level the number of selected satellites is increased, and wherein if the FER decreases below the threshold level the number of selected satellites is decreased.

16. A system as in claim 9, wherein the current reception state of the user terminal is indicated by a Frame Error Rate (FER), wherein if the FER increases above a threshold level, and the communication signal is being transmitted through a plurality of satellites, power is controlled proportionately on individual ones of said plurality of satellites to optimize the power resources of said plurality of satellites.

17. A system as in claim 9, and further comprising a ground operations control center (GOCC) that is coupled to said gateway, and wherein at least said current state of satellite power and said predicted required state of satellite power are determined in said GOCC.

18. A system as in claim 9, wherein said receiver of said user terminal is comprised of a multi-finger RAKE receiver for simultaneously receiving said communication signal from said gateway via said plurality of satellites.

* * * * *